(12) United States Patent
Huang (10) Patent No.: US 8,760,849 B2
(45) Date of Patent: Jun. 24, 2014

(54) LEAKAGE DETECTION PROTECTION CIRCUIT WITH LIGHTNING PROTECTION

(76) Inventor: Huadao Huang, Yueqing (CN)

(*) Notice: Subject to any disclaimer, the term of this patent is extended or adjusted under 35 U.S.C. 154(b) by 29 days.

(21) Appl. No.: 13/517,841

(22) Filed: Jun. 14, 2012

(65) Prior Publication Data

US 2012/0320485 A1    Dec. 20, 2012

(30) Foreign Application Priority Data

Jun. 17, 2011   (CN) .......................... 2011 1 0164065

(51) Int. Cl.
*H02H 3/16* (2006.01)
(52) U.S. Cl.
USPC ........................................... 361/361; 361/44
(58) Field of Classification Search
USPC ...................................................... 361/42–50
See application file for complete search history.

(56) References Cited

U.S. PATENT DOCUMENTS

| 7,573,692 B1 | 8/2009 | Weeks et al. |
| 2005/0030685 A1* | 2/2005 | DiSalvo .......................... 361/42 |
| 2012/0154972 A1* | 6/2012 | McMahon et al. ............ 361/187 |

* cited by examiner

*Primary Examiner* — Danny Nguyen
(74) *Attorney, Agent, or Firm* — Mei & Mark LLP (57) ABSTRACT

An electrical protection circuit comprises a circuit board, an induction coil, a self-exciting coil, a control chip, a silicon controlled rectifier, a rectifier diode, a resistor, a filtration capacitor, a trip coil with iron core, a group of main circuit switches, and a reset button. An analog electric single-pole double-throw switch linked with the reset button comprises a traveling contact lever, a first static contact jaw, and a second static contact jaw. When the reset button is in a tripped or reset state, the traveling contact lever is connected with the second static contact jaw and the switch is in a closed state. When the reset button is pressed down, the traveling contact lever disconnects from the second static contact jaw, contacts the first static contact jaw, then disconnects from the first static contact jaw and returns to the closed state with the second static contact jaw.

28 Claims, 6 Drawing Sheets

LEAKAGE DETECTION PROTECTION CIRCUIT WITH LIGHTNING PROTECTION

This application claims the benefit of priority of Chinese patent application 201110164065.6 filed Jun. 17, 2011, the content of which is incorporated herein by reference in its entirety.

TECHNICAL FIELD

A leakage detection protection circuit provides lightning impulse protection and is installed in an electric plug, electric outlet, or circuit interrupter with leakage protection function such as a GFCI (ground fault circuit interrupter).

BACKGROUND

Along with the continuous development of the industry of electric outlets such as ground fault circuit interrupting outlets ("GFCI"), electric plugs and electric switches with leakage protection functions, people are raising higher and higher requirements for the function and safety of electric outlets and electric plugs with leakage protection functions, especially for the electric outlet and electric plug in the USA.

SUMMARY

In one embodiment, an electrical protection circuit comprises a circuit board, an induction coil, a self-exciting coil, a control chip, a silicon controlled rectifier, a rectifier diode, a resistor, a filtration capacitor, a trip coil with iron core, a group of main circuit switches, and a reset button. An analog electric single-pole double-throw switch linked with the reset button comprises a traveling contact lever, a first static contact jaw, and a second static contact jaw. When the reset button is in a tripped state, the traveling contact lever is connected with the second static contact jaw and the switch is in a closed state. When the reset button is pressed down, the traveling contact lever disconnects from the second static contact jaw and the traveling contact lever contacts the first static contact jaw, whereupon the traveling contact lever disconnects from the first static contact jaw and returns to the closed state with the second static contact jaw. When the reset button is in a reset state, the traveling contact lever is connected with the second static contact jaw and the switch is in a closed state.

In additional embodiments, the electrical protection circuit can comprise first and second discharge sheet metals, first and second piezoresistors and/or third and fourth discharge sheet metals.

Additional objects and advantages will be set forth in part in the description which follows, and in part will be obvious from the description, or may be learned by practice of the disclosed embodiments. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the invention.

DETAILED DESCRIPTION

Reference will now be made in detail to the present embodiments, examples of which are illustrated in the accompanying drawings. Wherever possible, the same reference numbers will be used throughout the drawings to refer to the same or like parts.

To prevent damage to household electric appliances caused by thunderstorm and lightning, this inventor has long been engaged in developing leakage protection outlets. He improved the leakage detection protection circuit installed in electric plug, electric outlet or switch circuit interrupter with leakage protection function and re-located the discharge sheet metal, allowing the improved leakage detection protection circuit to have lightning impulse protection function really and truly, allowing the power output (GFCI), electric plug and electric switch equipped with this leakage detection protection circuit to have lightning impulse protection function and to protect the household electric appliances such as refrigerator, air conditioner and water heater connected with the power output (GFCI), electric plug and electric switch for the long term.

As shown in FIGS. 1~6, the leakage detection protection circuit with lightning impulse protection function is composed of an induction coil installed on a circuit board CB for detecting leakage current L1, self-exciting coil for detecting low-resistance fault L2, control chip IC1 (Model RV4145), silicon control rectifier (SCR) V4, rectifier diode V1, current-limiting resistor R1, filtration capacitor C3, trip coil integrated with iron core SOL, at least one pair of main circuit switches KR2-1 & KR2-2 linked with reset button RESET, and test switch KR-5 linked with the test button.

The live wire HOT of the power input end LINE penetrates the induction coil for detecting leakage current L1 and the self-exciting coil for detecting low-resistance fault L2, and is connected or disconnected through the main circuit switch KR2-1 linked with reset button with the live wire output plug bush of the power output socket and the live wire of power output end to provided with power.

The zero wire WHITE of the power input end LINE penetrates the induction coil for detecting leakage current L1 and the self-exciting coil for detecting low-resistance fault L2, and is connected or disconnected through the main circuit switch KR2-2 linked with reset button with the zero wire output plug bush of the power output socket and the zero wire of power output end to provided with power.

The live wire of the power output end LOAD and the live wire output plug bush of the power output socket are connected into an integral body. The zero wire of the power output end LOAD and the zero wire output plug bush of the power output socket are connected into an integral body.

The signal output ends of the induction coil for detecting leakage current L1 and self-exciting coil for detecting low-resistance fault L2 are connected with the detection signal input pins 1, 2, 3 & 7 of the control chip 101. The control signal output pin 5 of the control chip 101 is connected with the control pole of the silicon controlled rectifier V4. The output trigger signal controls the breakover/shutoff of the silicon controlled rectifier V4. Meanwhile, the control pole of the silicon controlled rectifier V4 is also connected with the control signal output end OUT of the timer chip DSQ. The timer chip DSQ gives a trigger signal regularly to make the silicon controlled rectifier V4 break over, thereby detecting whether the leakage detection protection circuit can work normally.

Figure 1:
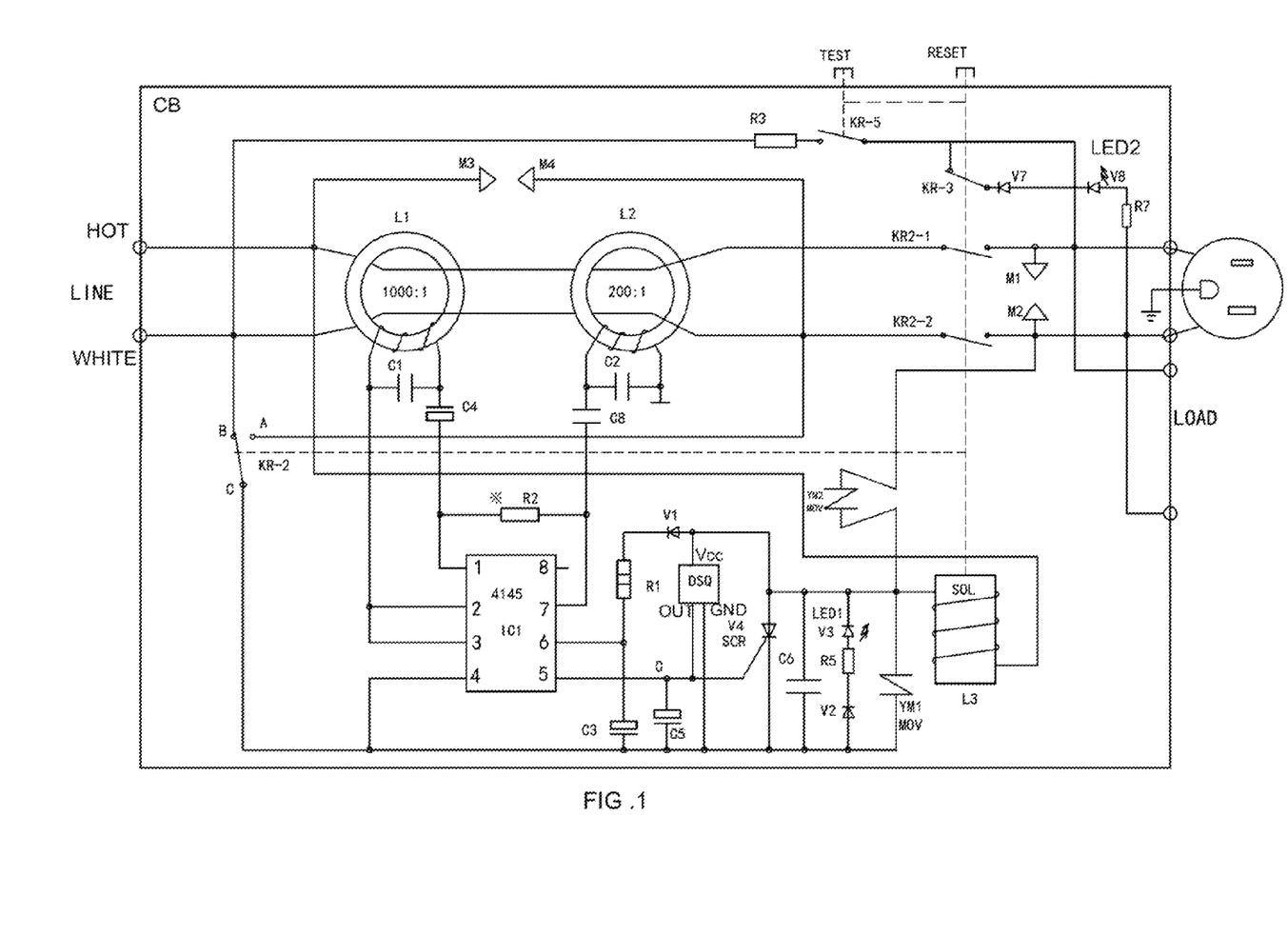
FIG. 1 is a circuit diagram of Embodiment 1 of the leakage detection protection circuit.
Figure 2:
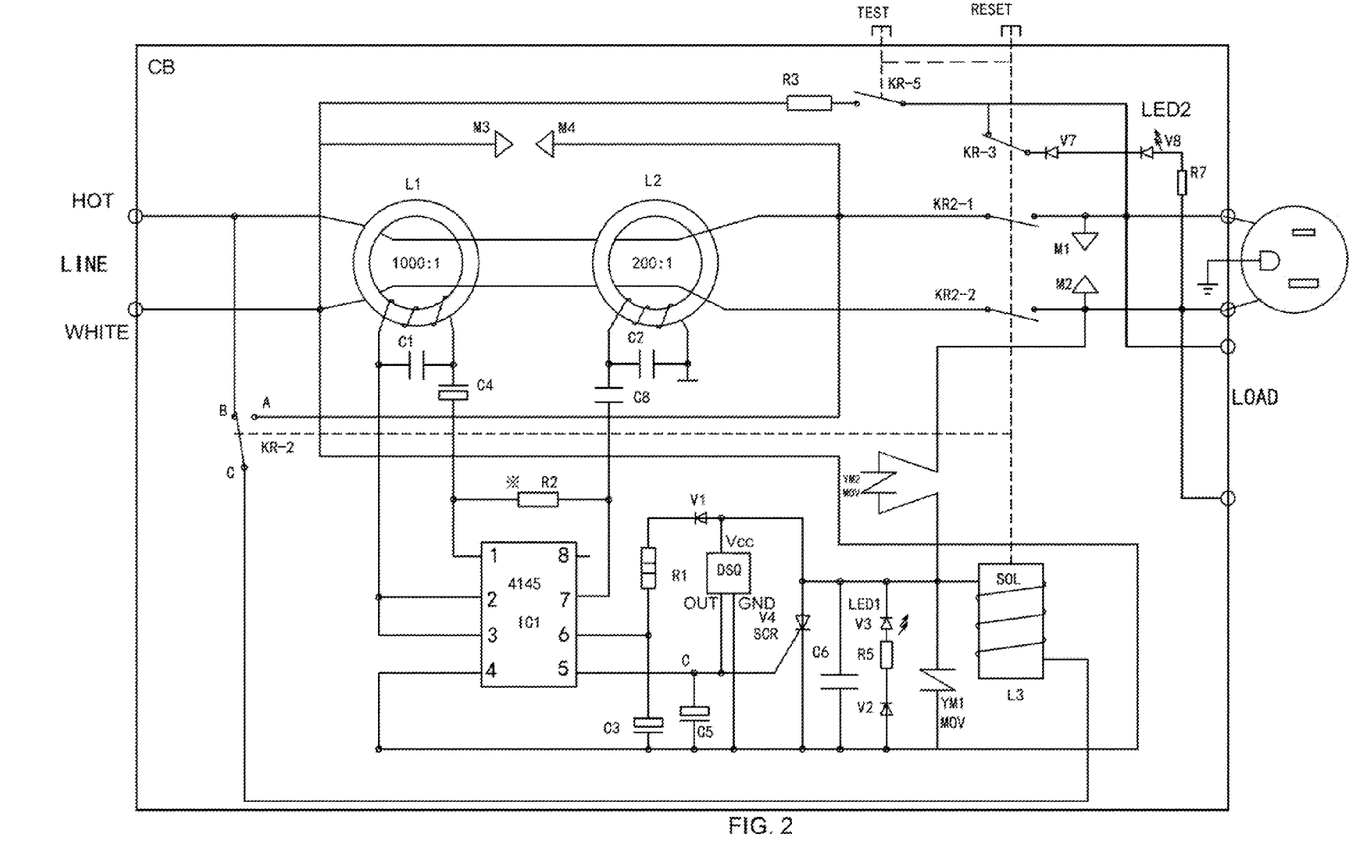
FIG. 2 is a circuit diagram of Embodiment 2 of the leakage detection protection circuit.

As shown in FIG. 1, at least one analog electric switch KR-2 is linked with a reset button RESET. This analog electric switch KR-2 is a single-pole double-throw switch. The second static contact jaw B is connected with the zero wire WHITE of the power input end LINE. The first static contact jaw A is connected with the electric zero wire WHIE penetrating induction coil for detecting leakage current L1 and self-exciting coil for detecting low-resistance fault L2. Its dynamic traveling contact lever C is connected with the IC1 input pin 4, the cathode of the silicon controlled rectifier V4 and the timer chip DSQ.

The input end 6 of the control chip IC1 is connected through current-limiting resistor R1, diode V1 and trip coil SOL with the live wire of power input end HOT. The anode of silicon controlled rectifier V4 and the working power input end of the timer chip DSQ are connected through trip coil SOL with the live wire of power input end HOT.

When the reset button RESET is in a tripped state, the traveling contact lever C of the analog electric switch KR-2 is connected with the second static contact jaw B, and the analog electric switch KR-2 is in a closed state. When the reset button RESET is pressed down, the traveling contact lever C of the analog electric switch KR-2 is disconnected from the second static contact jaw B, and is disconnected automatically at the moment when it contacts with the first static contact jaw A. The analog electric switch KR-2 converts automatically to the closed and connected state with the static contact jaw B. After the reset button resets, the traveling contact lever C of the analog electric switch KR-2 still contacts with the second static contact jaw B, and the analog electric switch KR-2 is still in closed state. Meanwhile, the circuit switches KR-2-1 & KR-2-2 are also in closed state, and the output end has power output.

Because the analog electric switch KR-2 of this invention has dual functions, one switch replaces the two switches (analog leakage current generation switch and power supply switch) in prior art leakage detection protection circuits. So the circuit is more compact and the volume is greatly reduced, reducing the cost and improving the market competitive power.

The said leakage detection protection circuit also includes a timed detection circuit chip DSQ. The power input pin of this timed chip is connected with the silicon controlled rectifier SCR V4 anode and the trip coil SOL. The working grounding pin of the said timed detection chip DSQ is connected with the zero wire of the silicon controlled rectifier V4 cathode pin. The control trigger pin of the said timed detection chip DSQ is connected with the silicon controlled rectifier V4 trigger pin.

To protect the leakage detection protection circuit and the household electric appliances connected with the leakage detection protection circuit from lightning, as shown in FIGS. 1-6, at least one group of discharge sheet metals M1 & M2 are provided. The tips or discharge arcs of the discharge sheet metals M1 & M2 are placed in opposed positions with each other, and are separated by a certain space between 0.7 mm-1.5 mm. One discharge sheet metal M1 is connected with the live wire output plug bush of the power output socket, and the other discharge sheet metal M2 is connected with the zero wire output plug bush of the power output socket.

The discharge sheet metals M1 & M2 are a pair of electrodes designed for making use of tip discharge effect. They are connected to the live wire and zero wire of the power input end or power output end respectively, and must be installed in the circuit to be protected. At the moment when lightning strikes the live wire and zero wire, it can generate between the live wire and zero wire a voltage ranging from several thousand volts to several ten thousand volts. This instantaneous impulse high voltage has severe damage function to the load of the electronic circuit. Therefore, this leakage detection protection circuit can be damaged, and accordingly the household electric appliances connected with the leakage protection outlet installed with this leakage detection protection circuit can also be impulsed and damaged. Therefore, the above discharge sheet metals M1 & M2 are equivalent to the lightning arrestor installed in the prior art leakage protection outlet.

To prevent lightning from damaging the leakage detection protection circuit, in an embodiment of this invention, the said at least one group of discharge sheet metals included can also be placed at the power input end, like discharge sheet metals M3 & M4 shown in FIG. 1. The tips or discharge arcs of the discharge sheet metals M3 & M4 are placed in opposed positions with each other, and are separated by a certain space 0.7 mm-1.5 mm. One discharge sheet metal M3 is connected with the live wire of power input end, and the other discharge sheet metal M4 is connected with the zero wire of power input end penetrating induction coil L1 and self-exciting coil L2. Or otherwise, as shown in FIGS. 2, 3, 4 & 6, discharge sheet metal M3 is connected with the zero wire of power input end, and discharge sheet metal M4 is connected with the live wire of power input end penetrating induction coil L1 and self-exciting coil L2.

Figure 3:
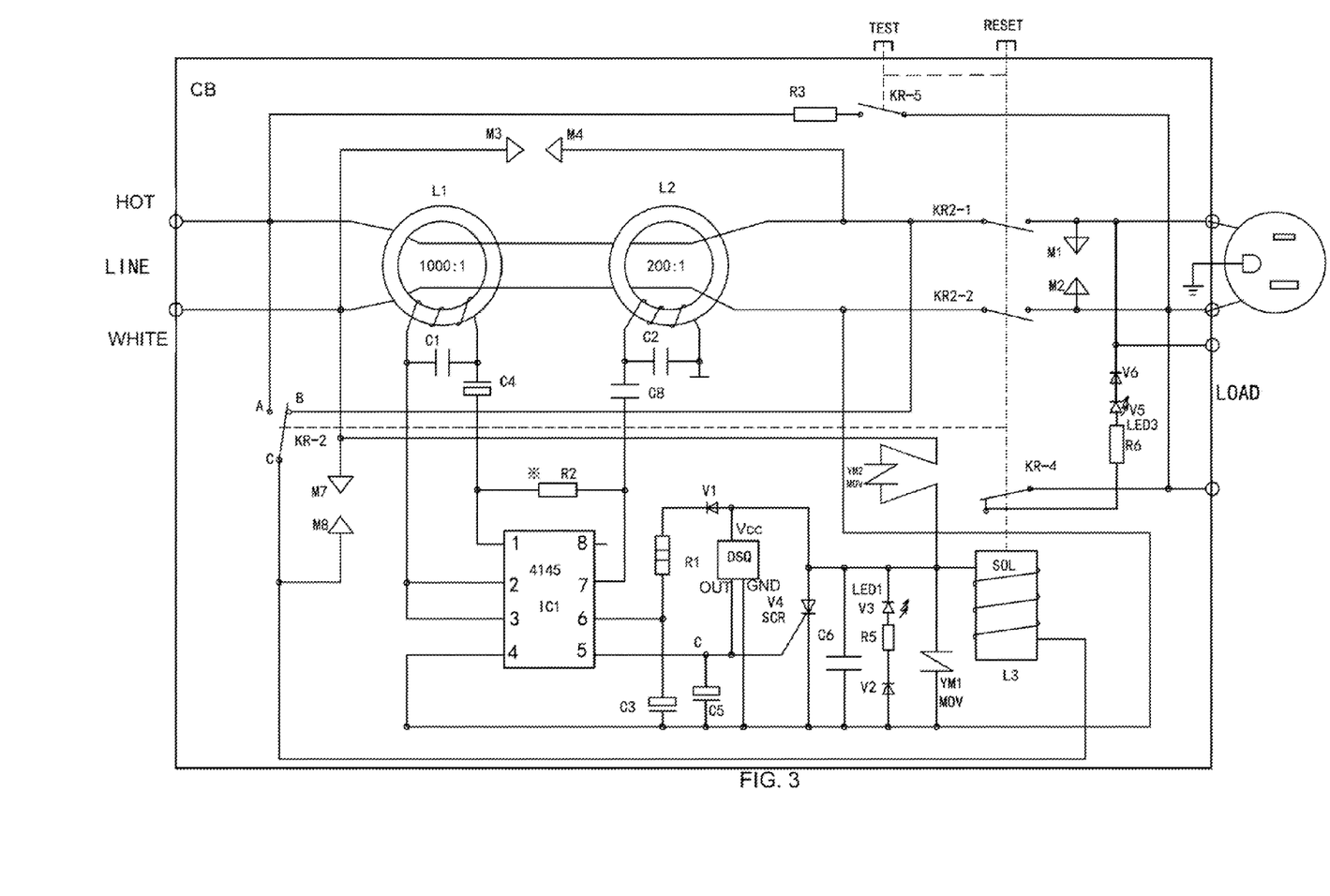
FIG. 3 is a circuit diagram of Embodiment 3 of the leakage detection protection circuit.

To prevent lightning from damaging the leakage detection protection circuit, in another embodiment of this invention, the at least one group of discharge sheet metals included can also be placed at other positions and be connected through analog electric switch KR-2 with the live or zero wire of power input end penetrating induction coil L1 and self-exciting coil L2, like discharge sheet metals M7 & M8 shown in FIG. 3. The tips or discharge arcs of the discharge sheet metals M7 & M8 are placed in opposed positions with each other, and are separated by a certain space 0.7 mm-1.5 mm. One discharge sheet metal M7 is connected with the zero wire of power input end, and the other discharge sheet metal M8 is connected through the closed analog electric switch KR-2 with the live wire of power input end penetrating induction coil L1 and self-exciting coil L2. As shown in FIG. 3, discharge sheet metal M8 is connected with the traveling contact lever C of analog electric switch KR-2. The second static contact jaw B of analog electric switch KR-2 is connected with the live wire of power input end penetrating induction coil L1 and self-exciting coil L2. The first static contact jaw A of analog electric switch KR-2 is connected with the live wire of power input end. In still other embodiments, one discharge metal sheet M3 is connected with the zero wire or live wire of the power input end and another discharge metal sheet M4 is connected with the other of the zero wire or live wire of the power input end penetrating only one of the induction coil L1 or self-exciting coil L2.

Figure 5:
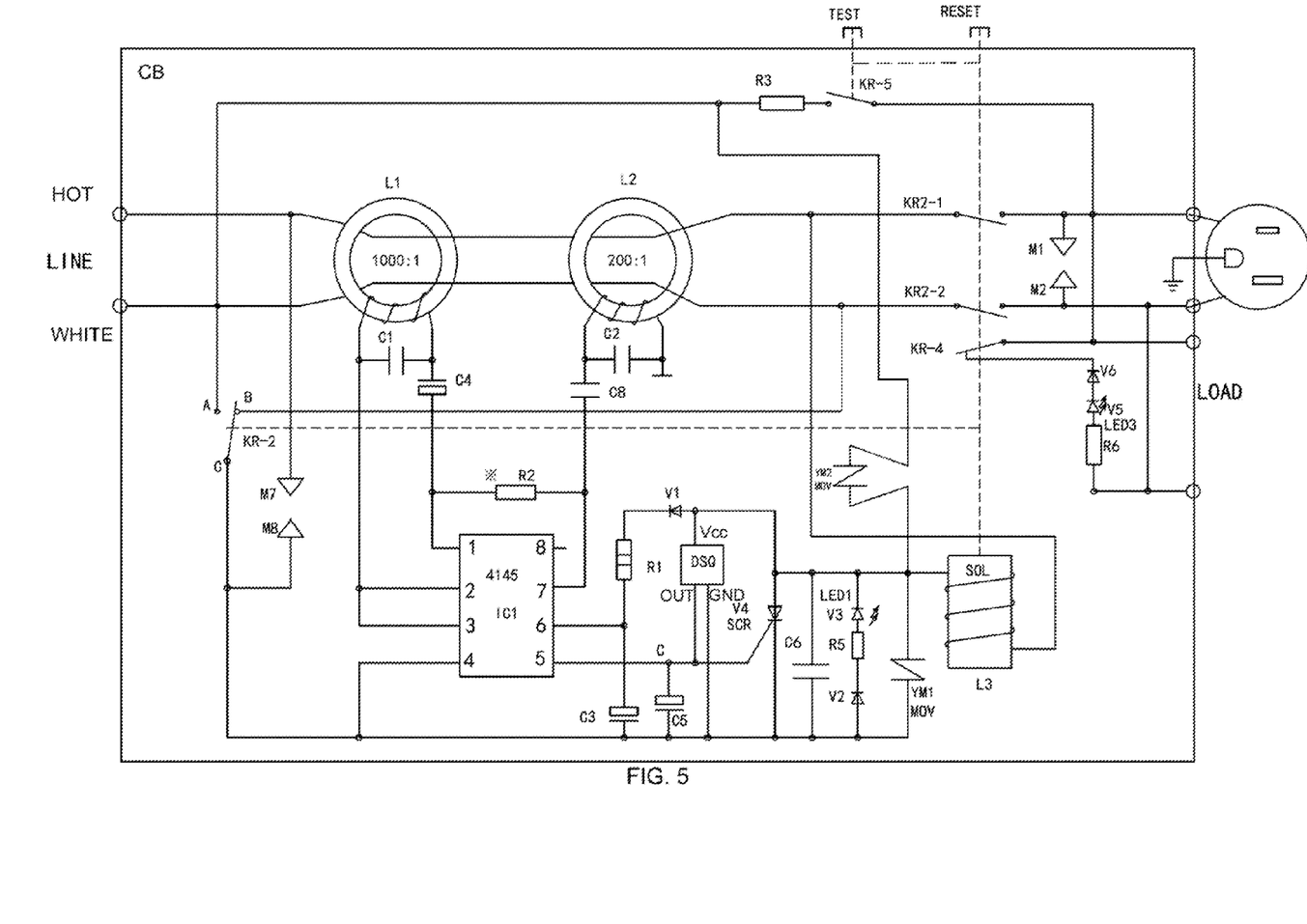
FIG. 5 is a circuit diagram of Embodiment 5 of the leakage detection protection circuit.

The connection mode of discharge sheet metal M7 & M8 in FIG. 5 is generally as same as that of discharge sheet metal M7 & M8 in FIG. 3. The difference is as follows: Discharge sheet metal M7 in FIG. 5 is connected with the live wire of power input end, and discharge sheet metal M8 is connected through the closed analog electric switch KR-2 with the zero wire of power input end. Specifically, discharge sheet metal M8 is connected with the traveling contact lever C of analog electric switch KR-2. The second static contact jaw B of analog electric switch KR-2 is connected with the zero wire of power input end penetrating induction coil L1 and self-exciting coil L2. The first static contact jaw A of analog electric switch KR-2 is connected with the zero wire of power input end.

The leakage detection protection circuit with lightning impulse protection function also includes at least two piezoresistors YM1 & YM2. When the voltage exceeds the preset voltage value, instantaneously, piezoresistor YM1 & YM2 can discharge the current, realizing the function of protecting the circuit and the electronic elements connected in the circuit.

As shown in FIG. 1, after piezoresistor YM1 and YM2 are connected in series, one end is connected with the zero wire output plug bush of the power output socket and the other end is connected through the closed analog electric switch KR-2 with the zero wire of the power input end. Moreover, the common end of the two connected piezoresistors YM1 & YM2 is connected through the trip coil SOL with the live wire of power input end. Specifically, after piezoresistors YM1 & YM2 are connected in series, the other end is connected with the traveling contact lever C of analog electric switch KR-2. The first static contact jaw A of the analog electric switch KR-2 is connected with the zero wire of power input end penetrating through the induction coil L1 and self-exciting coil L2, and the second static contact jaw B of the analog electric switch KR-2 is connected with the zero wire of power input end.

When the reset button RESET is in tripped state, the traveling contact lever C of this analog electric switch KR-2 is connected with the second static contact jaw B, and analog electric switch KR-2 is in closed state. When reset button RESET is pressed down, the traveling contact lever C of the analog electric switch KR-2 is disconnected from the second static contact jaw B, and is disconnected automatically at the moment when it contacts with the first static contact jaw A. The analog electric switch KR-2 converts automatically to the closed and connected state with the static contact jaw B. After the reset button resets, the traveling contact lever C of the analog electric switch KR-2 still contacts with the second static contact jaw B, and the analog electric switch KR-2 is still in closed state. In the meantime, circuit switches KR-2-1 & KR-2-2 are also in closed state, there is power output at the load end, and LED1 indicator is on.

In another embodiment of this invention, as shown in FIG. 3, after piezoresistors YM1 and YM2 are connected in series, one end is connected with the zero wire of power input end and the other end is connected with the zero wire of power input end penetrating induction coil L1 and self-exciting coil L2. Moreover, the common end of connected piezoresistors YM1 and YM2 is connected finally through trip coil SOL and the closed analog electric switch KR-2 with the electric live wire. Specifically, the common end of connected piezoresistors YM1 and YM2 is connected through trip coil SOL with the traveling contact lever C of analog electric switch KR-2, the first static contact jaw A of analog electric switch KR-2 is connected with the live wire of power input end, and the second static contact jaw B of analog electric switch KR-2 is connected with the live wire of power input end penetrating induction coil L1 and self-exciting coil L2.

Figure 4:
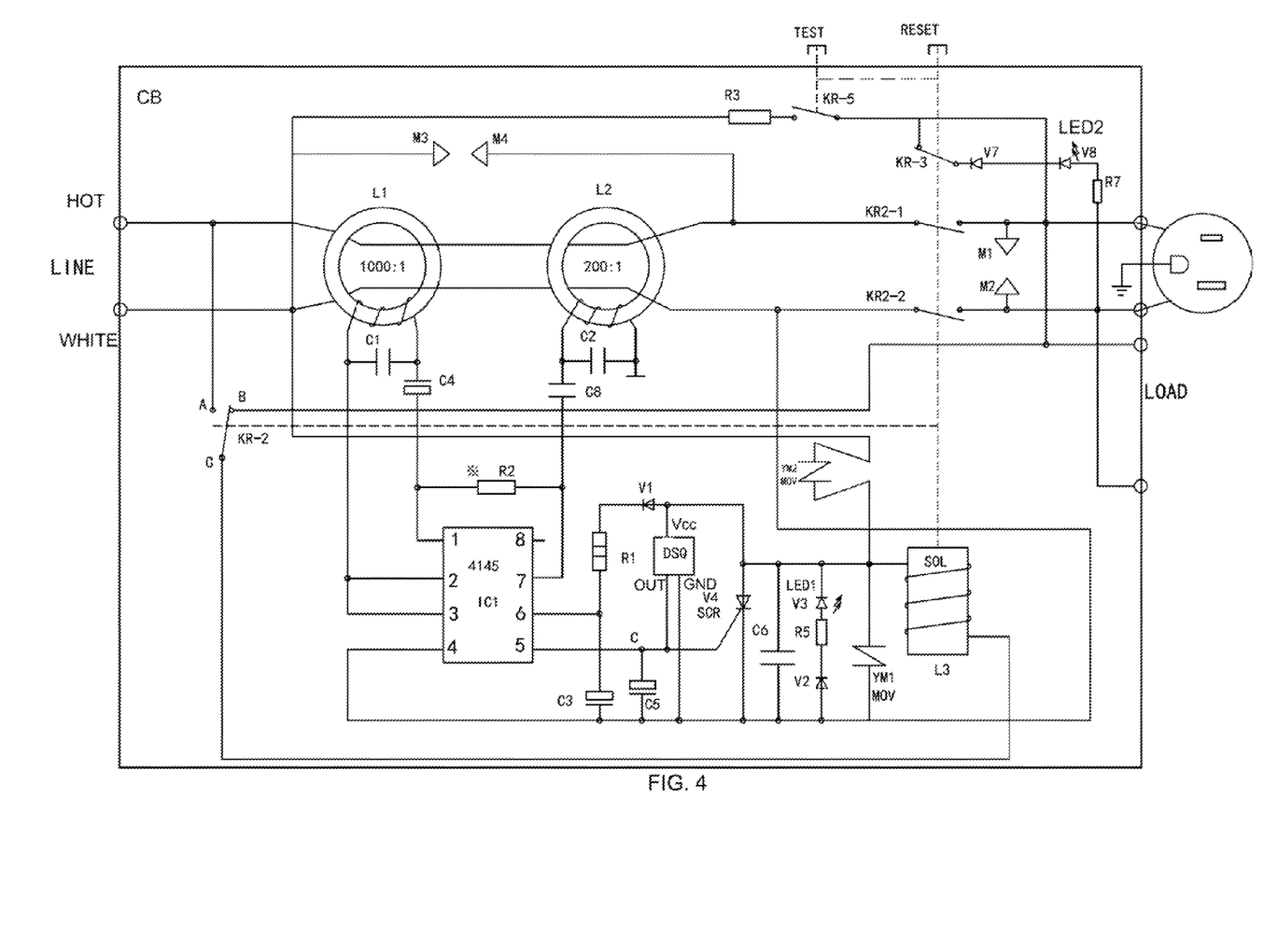
FIG. 4 is a circuit diagram of Embodiment 4 of the leakage detection protection circuit.

In another embodiment of this invention, as shown in FIG. 4, after piezoresistors YM1 and YM2 are connected in series, one end is connected with the zero wire of power input end and the other end is connected with the zero wire of power input end penetrating induction coil L1 and self-exciting coil L2. Moreover, the common end of connected piezoresistors YM1 and YM2 is connected through trip coil SOL and the closed analog electric switch KR-2 with the live wire of power output end. Specifically, the common end of connected piezoresistors YM1 and YM2 is connected through trip coil SOL with the traveling contact lever C of analog electric switch KR-2, the first static contact jaw A of analog electric switch KR-2 is connected with the live wire of power input end, and the second static contact jaw B of analog electric switch KR-2 is connected with the live wire of power input end penetrating induction coil L1 and self-exciting coil L2.

In another embodiment of this invention, as shown in FIG. 5, after piezoresistors YM1 and YM2 are connected in series, one end is connected with the zero wire of power input end and the other end is connected finally through the closed analog electric switch KR-2 with the zero wire of power input end. Moreover, the common end of connected piezoresistors YM1 and YM2 is connected through trip coil SOL with the live wire of power input end penetrating induction coil L1 and self-exciting coil L2. Specifically, the other end of piezoresistors YM1 and YM2 connected in series is connected with the traveling contact lever C of analog electric switch KR-2. The first static contact jaw A of analog electric switch KR-2 is connected with the zero wire of power input end. The second static contact jaw B of analog electric switch KR-2 is connected with the zero wire of power input end penetrating induction coil L1 and self-exciting coil L2.

When the reset button RESET is in tripped state, the traveling contact lever C of this analog electric switch KR-2 is connected with the second static contact jaw B, and analog electric switch KR-2 is in closed state. When reset button RESET is pressed down, the traveling contact lever C of the analog electric switch KR-2 is disconnected from the second static contact jaw B, and is disconnected automatically at the moment when it contacts with the first static contact jaw A. The analog electric switch KR-2 converts automatically to the closed and connected state with the static contact jaw B. After the reset button resets, the traveling contact lever C of the analog electric switch KR-2 still contacts with the second static contact jaw B, and the analog electric switch KR-2 is still in closed state. In the meantime, circuit switches KR-2-1 & KR-2-2 are also in closed state, there is power output at the load end, and LED1 indicator is on.

Figure 6:
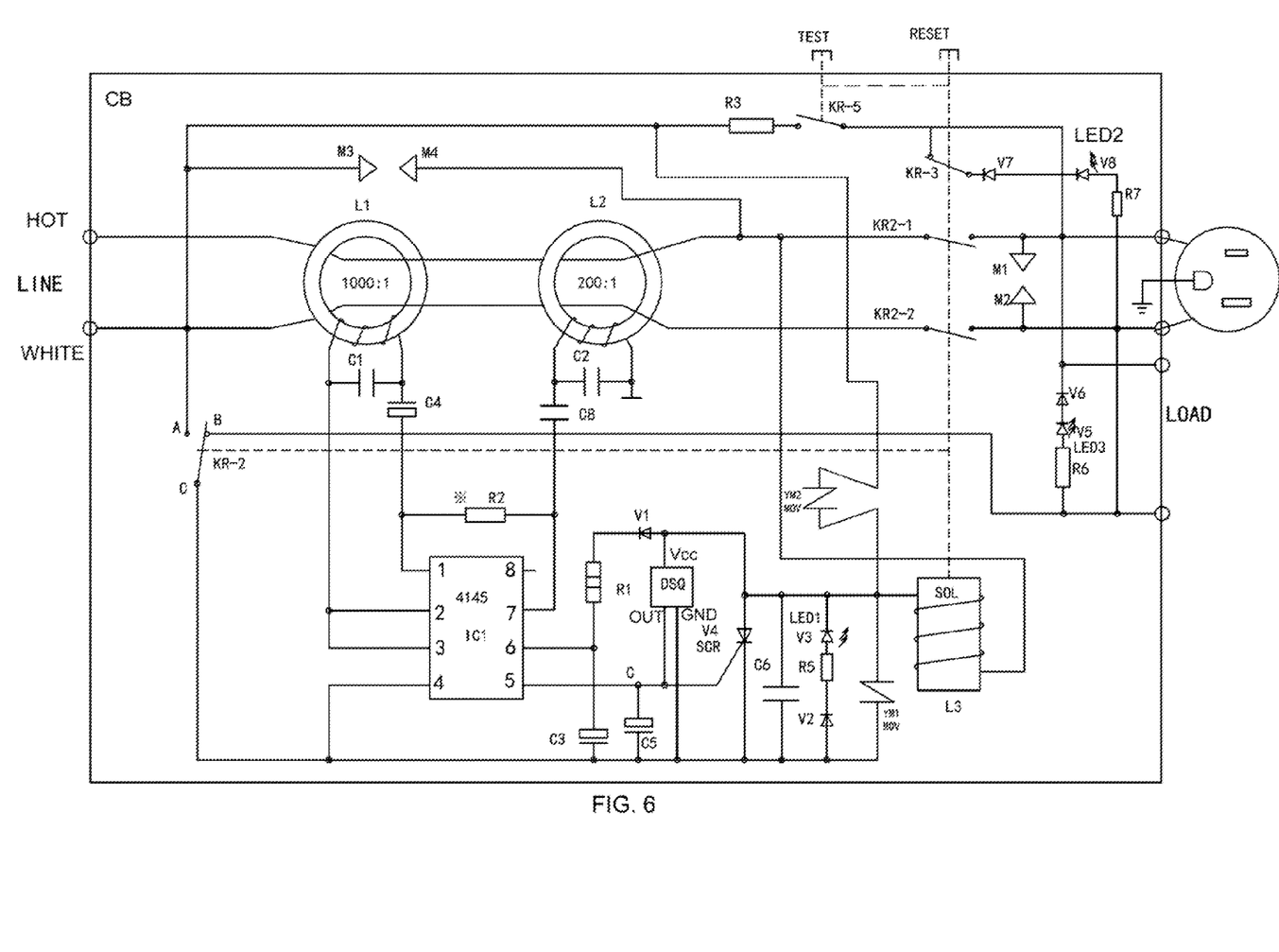
FIG. 6 is a circuit diagram of Embodiment 6 of the leakage detection protection circuit.

In another embodiment of this invention, as shown in FIG. 6, after piezoresistors YM1 and YM2 are connected in series, one end is connected with the zero wire of power input end and the other end is connected with the traveling contact lever C of analog electric switch KR-2. The first static contact jaw A of analog electric switch KR-2 is connected with the zero wire of power input end. The second static contact jaw B of analog electric switch KR-2 is connected with the zero wire of power output end. Moreover, the common end of piezoresistors YM1 and YM2 connected is connected through trip coil SOL with the live wire of power input end penetrating induction coil L1 and self-exciting coil L2.

When the reset button RESET is in tripped state, the traveling contact lever C of this analog electric switch KR-2 is connected with the second static contact jaw B, and analog electric switch KR-2 is in closed state. When reset button RESET is pressed down, the traveling contact lever C of the analog electric switch KR-2 is disconnected from the second static contact jaw B, and is disconnected automatically at the moment when it contacts with the first static contact jaw A. The analog electric switch KR-2 converts automatically to the closed and connected state with the static contact jaw B. After the reset button resets, the traveling contact lever C of the analog electric switch KR-2 still contacts with the second static contact jaw B, and the analog electric switch KR-2 is still in closed state. In the meantime, circuit switches KR-2-1 & KR-2-2 are also in closed state, there is power output at the load end, and LED1 indicator is on.

To reflect the working state of the leakage detection protection circuit in time, as shown in FIG. 6, this invention also includes display circuit. This display circuit is composed of power output indicator LED3, diode V6 and current-limiting resistor R6. After the power output indicator LED3, diode V6 and current-limiting resistor R6 are connected in series, one end is connected with the live wire of power output end, and the other end is connected with the zero wire of power output end. When the leakage detection protection circuit power output end has power output, the power output indicator LED3 is on. Otherwise, it is off.

In addition, this display circuit also has wiring mistake display function. When the installer mistakenly connects the wall-mounted power wire with the power output end LOAD of the leakage detection protection circuit, though reset button RESET is in tripped state, the power output indicator LED3 is still on, indicating the wiring mistake of this leakage detection protection circuit. On the contrary, when the installer connects the wires correctly, even when the reset button RESET is in tripped state, this power output indicator LED3 is not on.

The leakage detection protection circuit shown in FIGS. 3 & 5 includes a wiring mistake display circuit. This wiring mistake display circuit is composed of normally-closed switch KR-4 linked with reset button, indicator LED3, diode V6 and current-limiting resistor R6. After the normally-closed switch KR-4 linked with reset button, indicator LED3, diode V6 and current-limiting resistor R6 are connected in series, one end is connected with the live wire of power output end and the other end is connected with the zero wire of power output end. When the reset button RESET is in tripped state, switch KR-4 is closed. When the reset button RESET is in reset state, switch KR-4 is open and indicator LED3 is not on, indicating that the wiring is correct.

When the installer mistakenly connects the wall-mounted power wire with the power output end LOAD of the leakage detection protection circuit, because reset button RESET is in tripped state, switch KR-4 is in closed state and indicator LED3 is on, indicating that the wiring of the leakage detection protection circuit is mistaken. On the contrary, when the installer connects the wires correctly, even when the reset button RESET is in tripped state and switch KR-4 is in closed state, because the power output end of the leakage detection protection circuit is not electrified, indicator LED3 is not on.

The above wiring mistake display circuit can also be as shown in FIGS. 1, 2, 4 & 6. It is composed of normally-closed switch KR-3 linked with reset button, indicator V8, diode V7 and current-limiting resistor R7. After the normally-closed switch KR-3 linked with reset button, indicator V8, diode V7 and current-limiting resistor R7 are connected in series, one end is connected with the live wire of power output plug bush and the other end is connected with the zero wire of power output plug bush. When reset button RESET is in tripped state, switch KR-3 is closed. When reset button RESET is in reset state, switch KR-3 is disconnected.

When the installer mistakenly connects the wall-mounted power wire with the power output end LOAD of the leakage detection protection circuit, though reset button RESET is in tripped state, switch KR-3 is in closed state and indicator V8 is on, indicating that the wiring of the leakage detection protection circuit is mistaken. When the installer connects the wires correctly, even when the reset button RESET is in reset state and switch KR-3 is in open state, because the indicator circuit diode, resistor and LED2 are not electrified, indicator V8 is not on indicating correct wiring and the working indicator LED1 is on.

As shown in FIGS. 1-6, this invention also includes an analog working indicator circuit. This analog working indicator circuit is composed of indicator LED1, diode V2 and analog resistor R5. After indicator LED1, diode V2 and analog resistor R5 are connected in series, one end is connected with the power live wire of trip coil SOL and the other end is connected through analog electric switch KR-2 with the zero wire of the power supply.

The analog working indicator circuit of this invention has dual functions: 1. When the reset button is pressed down, if the life of the leakage detection protection circuit is not over, this analog working indicator circuit generates analog leakage current, and the indicator LED1 flashes once. If the life of the leakage detection protection circuit is over, it will keep the reset button from resetting. 2. Meanwhile, this analog working indicator circuit has indication and display function, indicating whether the life of the leakage detection protection circuit is over and whether it can work normally. Therefore, the analog working indicator circuit of this invention combines two functions into one and the circuit is more compact.

The advantage of this invention is as follows: at least one pair of discharge sheet metals is provided at different places in the leakage detection protection circuit, realizing the function of protecting the leakage detection protection circuit as well as the household electric appliances connected with the leakage detection protection circuit. When a discharge occurs on the discharge sheet metals, the power to the load and user load terminals is discontinued because of the imbalance sensed in the inductance coil and or self-exciting coil. The arrangement of discharge sheet metals also improves the life of the receptacles.

This invention has also another advantage: One end of one of the piezoresistors is connected with the live or zero wire of the input end while the other end is connected with the zero or live wire of the power output end penetrating the dual induction coils. With this connection method, the piezoresistor can generate leakage current automatically in case of over-voltage discharge, inducing the trip mechanism to trip, cutting off the power supply of the circuit, and again realizing the function of protecting the electronic elements.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrical protection circuit, comprising:
    a circuit board comprising electrical connections and further comprising:
        an induction coil for detecting a leakage current;
        a self-exciting coil for detecting a low-resistance fault;
        a control chip;
        a silicon controlled rectifier;
        a rectifier diode;
        a resistor;
        a filtration capacitor;
        a trip coil with integrated iron core;
        at least one group of main circuit switches;
        a reset button linked with the main circuit switches; and
        an analog electric single-pole double-throw switch linked with the reset button, the switch comprising:

a traveling contact lever;
a first static contact jaw; and
a second static contact jaw,
wherein the circuit is configured such that, when the reset button is in a tripped state, the traveling contact lever is connected with the second static contact jaw and the switch is in a closed state,
wherein the circuit is configured such that, when the reset button is pressed down, the traveling contact lever disconnects from the second static contact jaw and the traveling contact lever contacts the first static contact jaw, whereupon the traveling contact lever disconnects from the first static contact jaw and returns to the closed state with the second static contact jaw, and
wherein the circuit is configured such that, when the reset button is in a reset state, the traveling contact lever is connected with the second static contact jaw and the switch is in a closed state.

2. The circuit of claim 1, further comprising:
a power output plug bush comprising a live wire and a zero wire;
a first discharge sheet metal comprising one of tips or discharge arcs; and
a second discharge sheet metal comprising one of tips or discharge arcs, wherein:
the first and second discharge sheet metals are placed in opposed positions and are separated by a space,
the first discharge sheet metal is electrically connected with the live wire of the power output plug bush, and
the second discharge sheet metal is electrically connected with the zero wire of the power output plug bush.

3. The circuit of claim 1, further comprising:
a power input end comprising a live wire and a zero wire;
a first discharge sheet metal comprising one of tips or discharge arcs; and
a second discharge sheet metal comprising one of tips or discharge arcs, wherein:
the first and second discharge sheet metals are placed in opposed positions and are separated by a space,
the first discharge sheet metal is electrically connected with the live wire of the power input end, and
the second discharge sheet metal is electrically connected with the zero wire of the power input end after the power input end penetrates through the induction coil and the self-exciting coil.

4. The circuit of claim 1, further comprising:
a power input end comprising a live wire and a zero wire;
a first discharge sheet metal comprising one of tips or discharge arcs; and
a second discharge sheet metal comprising one of tips or discharge arcs, wherein:
the first and second discharge sheet metals are placed in opposed positions and are separated by a space,
the first discharge sheet metal is electrically connected with the zero wire of the power input end, and
the second discharge sheet metal is electrically connected with the live wire of the power input end after the power input end penetrates through the induction coil and the self-exciting coil.

5. The circuit of claim 1, further comprising:
a power input end comprising a live wire and a zero wire;
a first discharge sheet metal comprising one of tips or discharge arcs; and
a second discharge sheet metal comprising one of tips or discharge arcs, wherein:
the first and second discharge sheet metals are placed in opposed positions and are separated by a space,
the first discharge sheet metal is electrically connected with the zero wire of the power input end,
the second discharge sheet metal is electrically connected to the traveling contact lever,
when the traveling contact lever is connected with the second contact jaw, the second discharge sheet metal is electrically connected with the live wire of the power input end after the power input end penetrates through the induction coil and the self-exciting coil, and
the first static contact jaw is electrically connected to the live wire of the power input end.

6. The circuit of claim 1, further comprising:
a power input end comprising a live wire and a zero wire;
a first discharge sheet metal comprising one of tips or discharge arcs; and
a second discharge sheet metal comprising one of tips or discharge arcs, wherein:
the first and second discharge sheet metals are placed in opposed positions and are separated by a space,
the first discharge sheet metal is electrically connected with the live wire of the power input end,
the second discharge sheet metal is electrically connected to the traveling contact lever,
when the traveling contact lever is electrically connected with the second contact jaw, the second discharge sheet metal is electrically connected with the zero wire of the power input end after the power input end penetrates through the induction coil and the self-exciting coil, and
the first static contact jaw is electrically connected to the zero wire of the power input end.

7. The circuit of claim 1, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power output end,
a second end of the connected first and second piezoresistors is electrically connected to the zero wire of the power input end through the traveling contact lever when the traveling contact lever is electrically connected to the second static contact jaw,
the common electrical connection is electrically connected to the live wire of the power input end through the trip coil, and
the first static contact jaw is electrically connected to the zero wire of the power input end after the zero wire of the power input end penetrates through the induction coil and the self-exciting coil.

8. The circuit of claim 3, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power output end, a second end of the connected first and second piezoresistors is electrically connected to the zero wire of the power input end through the traveling contact lever when the traveling contact lever is electrically connected to the second static contact jaw, the common electrical connection is electrically connected to the live wire of the power input end through the trip coil, and the first static contact jaw is electrically connected to the zero wire of the power input end after the zero wire of the power input end penetrates through the induction coil and the self-exciting coil.

9. The circuit of claim 6, further comprising:

a first piezoresistor and a second piezoresistor connected in series and sharing a common electrical connection;

a power output end comprising a zero wire and a live wire; and a power input end comprising a zero wire and a live wire, wherein:

a first end of the connected first and second piezoresistors is electrically connected to the zero wire of the power output end, a second end of the connected first and second piezoresistors is electrically connected to the zero wire of the power input end through the traveling contact lever when the traveling contact lever is electrically connected to the second static contact jaw, the common electrical connection is electrically connected to the live wire of the power input end through the trip coil, and the first static contact jaw is electrically connected to the zero wire of the power input end after the zero wire of the power input end penetrates through the induction coil and the self-exciting coil.

10. The circuit of claim 1, further comprising:

a first piezoresistor and a second piezoresistor connected in series and sharing a common electrical connection;

a power output end comprising a zero wire and a live wire; and a power input end comprising a zero wire and a live wire, wherein:

a first end of the connected first and second piezoresistors is electrically connected to the zero wire of the power output end, a second end of the connected first and second piezoresistors is electrically connected to the zero wire of the power input end, the common electrical connection is electrically connected to the live wire of the power input end through the trip coil and through the traveling contact lever when the traveling contact lever is electrically connected to the second static contact jaw, and the first static contact jaw is electrically connected to the live wire of the power input end after the live wire of the power input end penetrates through the induction coil and the self-exciting coil.

11. The circuit of claim 4, further comprising:

a first piezoresistor and a second piezoresistor connected in series and sharing a common electrical connection;

a power output end comprising a zero wire and a live wire; and a power input end comprising a zero wire and a live wire, wherein:

a first end of the connected first and second piezoresistors is electrically connected to the zero wire of the power output end, a second end of the connected first and second piezoresistors is electrically connected to the zero wire of the power input end, the common electrical connection is electrically connected to the live wire of the power input end through the trip coil and through the traveling contact lever when the traveling contact lever is electrically connected to the second static contact jaw, and the first static contact jaw is electrically connected to the live wire of the power input end after the live wire of the power input end penetrates through the induction coil and the self-exciting coil.

12. The circuit of claim 5, further comprising:

a first piezoresistor and a second piezoresistor connected in series and sharing a common electrical connection;

a power output end comprising a zero wire and a live wire; and a power input end comprising a zero wire and a live wire, wherein:

a first end of the connected first and second piezoresistors is electrically connected to the zero wire of the power output end, a second end of the connected first and second piezoresistors is electrically connected to the zero wire of the power input end, the common electrical connection is electrically connected to the live wire of the power input end through the trip coil and through the traveling contact lever when the traveling contact lever is electrically connected to the second static contact jaw, and the first static contact jaw is electrically connected to the live wire of the power input end after the live wire of the power input end penetrates through the induction coil and the self-exciting coil.

13. The circuit of claim 1, further comprising:

a first piezoresistor and a second piezoresistor connected in series and sharing a common electrical connection;

a power output end comprising a zero wire and a live wire; and a power input end comprising a zero wire and a live wire, wherein:

a first end of the connected first and second piezoresistors is electrically connected to the zero wire of the power input end, a second end of the connected first and second piezoresistors is electrically connected to the zero wire of the power input end after the zero wire of the power input end penetrates through the induction coil and the self-exciting coil, the common electrical connection is electrically connected to the live wire of the power input end through the trip coil and through the traveling contact lever when the traveling contact lever is electrically connected to the second static contact jaw, and the first static contact jaw is electrically connected to the live wire of the power input, and the second static contact jaw is electrically connected to the live wire of the power input end after the live wire of the power input end penetrates through the induction coil and the self-exciting coil.

14. The circuit of claim 4, further comprising:

a first piezoresistor and a second piezoresistor connected in series and sharing a common electrical connection;

a power output end comprising a zero wire and a live wire; and a power input end comprising a zero wire and a live wire, wherein:

a first end of the connected first and second piezoresistors is electrically connected to the zero wire of the power input end,
a second end of the connected first and second piezoresistors is electrically connected to the zero wire of the power input end after the zero wire of the power input end penetrates through the induction coil and the self-exciting coil,
the common electrical connection is electrically connected to the live wire of the power input end through the trip coil and through the traveling contact lever when the traveling contact lever is electrically connected to the second static contact jaw, and
the first static contact jaw is electrically connected to the live wire of the power input, and
the second static contact jaw is electrically connected to the live wire of the power input end after the live wire of the power input end penetrates through the induction coil and the self-exciting coil.

15. The circuit of claim 5, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the zero wire of the power input end after the zero wire of the power input end penetrates through the induction coil and the self-exciting coil,
the common electrical connection is electrically connected to the live wire of the power input end through the trip coil and through the traveling contact lever when the traveling contact lever is electrically connected to the second static contact jaw, and
the first static contact jaw is electrically connected to the live wire of the power input, and
the second static contact jaw is electrically connected to the live wire of the power input end after the live wire of the power input end penetrates through the induction coil and the self-exciting coil.

16. The circuit of claim 1, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the zero wire of the power input end after the zero wire of the power input end penetrates through the induction coil and the self-exciting coil,
the common electrical connection is electrically connected to the live wire of the power output end through the trip coil and through the traveling contact lever when the traveling contact lever is electrically connected to the second static contact jaw,
the first static contact jaw is electrically connected to the live wire of the power input, and
the second static contact jaw is electrically connected to the live wire of the power output end.

17. The circuit of claim 4, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the zero wire of the power input end after the zero wire of the power input end penetrates through the induction coil and the self-exciting coil,
the common electrical connection is electrically connected to the live wire of the power output end through the trip coil and through the traveling contact lever when the traveling contact lever is electrically connected to the second static contact jaw,
the first static contact jaw is electrically connected to the live wire of the power input, and
the second static contact jaw is electrically connected to the live wire of the power output end.

18. The circuit of claim 1, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the zero wire of the power input end through the traveling contact lever when the traveling contact lever is electrically connected to the second static contact jaw,
the common electrical connection is electrically connected through the trip coil to the live wire of the power input end after the live wire of the power input end penetrates through the induction coil and the self-exciting coil,
the first static contact jaw is electrically connected to the zero wire of the power input, and
the second static contact jaw is electrically connected to the zero wire of the power input end after the zero wire of the power input end penetrates through the induction coil and the self-exciting coil.

19. The circuit of claim 3, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the zero wire of the power input end through the traveling contact lever when the traveling contact lever is electrically connected to the second static contact jaw, the common electrical connection is electrically connected through the trip coil to the live wire of the power input end after the live wire of the power input end penetrates through the induction coil and the self-exciting coil, the first static contact jaw is electrically connected to the zero wire of the power input, and the second static contact jaw is electrically connected to the zero wire of the power input end after the zero wire of the power input end penetrates through the induction coil and the self-exciting coil.

20. The circuit of claim 6, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the zero wire of the power input end through the traveling contact lever when the traveling contact lever is electrically connected to the second static contact jaw,
the common electrical connection is electrically connected through the trip coil to the live wire of the power input end after the live wire of the power input end penetrates through the induction coil and the self-exciting coil,
the first static contact jaw is electrically connected to the zero wire of the power input, and
the second static contact jaw is electrically connected to the zero wire of the power input end after the zero wire of the power input end penetrates through the induction coil and the self-exciting coil.

21. The circuit of claim 1, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the traveling contact lever,
the common electrical connection is electrically connected through the trip coil to the live wire of the power input end after the live wire of the power input end penetrates through the induction coil and the self-exciting coil,
the first static contact jaw is electrically connected to the zero wire of the power input end, and
the second static contact jaw is electrically connected to the zero wire of the power output end.

22. The circuit of claim 4, further comprising:
a first piezoresistor and a second piezoresistor connected in series and sharing a common electrical connection;
a power output end comprising a zero wire and a live wire; and
a power input end comprising a zero wire and a live wire, wherein:
a first end of the connected first and second piezoresistors is electrically connected to the zero wire of the power input end,
a second end of the connected first and second piezoresistors is electrically connected to the traveling contact lever,
the common electrical connection is electrically connected through the trip coil to the live wire of the power input end after the live wire of the power input end penetrates through the induction coil and the self-exciting coil,
the first static contact jaw is electrically connected to the zero wire of the power input end, and
the second static contact jaw is electrically connected to the zero wire of the power output end.

23. The circuit of claim 3, further comprising:
a power output plug bush comprising a live wire and a zero wire;
a third discharge sheet metal comprising one of tips or discharge arcs; and
a fourth discharge sheet metal comprising one of tips or discharge arcs, wherein:
the third and fourth discharge sheet metals are placed in opposed positions and are separated by a space,
the third discharge sheet metal is electrically connected with the live wire of the power output plug bush, and
the fourth discharge sheet metal is electrically connected with the zero wire of the power output plug bush.

24. The circuit of claim 4, further comprising:
a power output plug bush comprising a live wire and a zero wire;
a third discharge sheet metal comprising one of tips or discharge arcs; and
a fourth discharge sheet metal comprising one of tips or discharge arcs, wherein:
the third and fourth discharge sheet metals are placed in opposed positions and are separated by a space,
the third discharge sheet metal is electrically connected with the live wire of the power output plug bush, and
the fourth discharge sheet metal is electrically connected with the zero wire of the power output plug bush.

25. The circuit of claim 5, further comprising:
a power output plug bush comprising a live wire and a zero wire;
a third discharge sheet metal comprising one of tips or discharge arcs; and
a fourth discharge sheet metal comprising one of tips or discharge arcs, wherein:
the third and fourth discharge sheet metals are placed in opposed positions and are separated by a space,
the third discharge sheet metal is electrically connected with the live wire of the power output plug bush, and
the fourth discharge sheet metal is electrically connected with the zero wire of the power output plug bush.

26. The circuit of claim 6, further comprising:
a power output plug bush comprising a live wire and a zero wire;
a third discharge sheet metal comprising one of tips or discharge arcs; and
a fourth discharge sheet metal comprising one of tips or discharge arcs, wherein:
the third and fourth discharge sheet metals are placed in opposed positions and are separated by a space,
the third discharge sheet metal is electrically connected with the live wire of the power output plug bush, and
the fourth discharge sheet metal is electrically connected with the zero wire of the power output plug bush.

27. The circuit of claim 1, further comprising a timed detection circuit chip comprising a power input pin, a ground pin, and a control trigger pin, wherein the power input pin is electrically connected to the trip coil and an anode of the silicon controlled rectifier, the ground pin is electrically connected to a cathode of the silicon controlled rectifier, and the control trigger pin is electrically connected to a trigger pin of the silicon controlled rectifier.

28. The circuit of claim 1 further comprising:
a power output end;
a power input end;
a normally-closed switch linked with the reset button; and
at least one group of false wiring indicator circuits connected with the normally-closed switch, the at least one group of false wiring indicator circuits comprising:
an indicator;
a diode; and
a resistor,
wherein the normally-closed switch, the indicator, the diode, and the resistor are connected in series and one end of the series is connected with the zero wire of the power output end and another end of the series is connected with the live wire of the power output end.

* * * * *